(12) United States Patent
Suzuki et al.

(10) Patent No.: US 7,864,325 B2
(45) Date of Patent: Jan. 4, 2011

(54) INTERFEROMETER, DEMODULATOR, AND SPLITTING ELEMENT

(75) Inventors: Yasuyuki Suzuki, Tokyo (JP); Yoshihiro Sanpei, Tokyo (JP); Shinji Iio, Tokyo (JP); Morio Wada, Tokyo (JP); Mamoru Hihara, Tokyo (JP); Koki Iemura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 164 days.

(21) Appl. No.: 12/054,661

(22) Filed: Mar. 25, 2008

(65) Prior Publication Data
US 2009/0027683 A1 Jan. 29, 2009

(30) Foreign Application Priority Data
Mar. 27, 2007 (JP) .............................. 2007-080447

(51) Int. Cl.
*G01B 9/02* (2006.01)
(52) U.S. Cl. ....................................... 356/450; 359/583
(58) Field of Classification Search ................. 356/450, 356/477; 359/483, 487
See application file for complete search history.

(56) References Cited

U.S. PATENT DOCUMENTS

| | | | |
|---|---|---|---|
| 6,233,054 B1 | 5/2001 | Thériault | |
| 6,369,951 B1 | 4/2002 | Spanner | |
| 7,187,871 B1 * | 3/2007 | Kaushik | ..................... 398/183 |
| 2004/0263990 A1 | 12/2004 | Hsieh | |

FOREIGN PATENT DOCUMENTS

| | | |
|---|---|---|
| DE | 41 27 548 A1 | 2/1993 |
| EP | 0 236 137 A2 | 9/1987 |
| EP | 1 031 868 A1 | 8/2000 |
| JP | 2005-234346 A | 9/2005 |
| WO | WO 02/51041 A2 | 6/2002 |
| WO | 2006/091866 A2 | 8/2006 |

OTHER PUBLICATIONS

European Communication with Search Report dated Nov. 18, 2008, issued in corresponding EP Application No. 08005533.8, 5 pages.

(Continued)

*Primary Examiner*—Tarifur Chowdhury
*Assistant Examiner*—Jonathon D Cook
(74) *Attorney, Agent, or Firm*—Sughrue Mion, PLLC

(57) ABSTRACT

An interferometer of the invention includes: a first splitting element which includes a first transparent medium and a first splitting film formed on the first transparent medium, and which splits incident light into a first split beam and a second split beam, the first split beam being the incident light reflected by the first splitting element and the second split beam being the incident light transmitted through the first splitting element; and a second splitting element which includes a second transparent medium and a second splitting film formed on the second transparent medium, and which causes interference between the first split beam and the second split beam passed through different optical paths, the second splitting element being positioned such that a positional relationship between the second transparent medium and the second splitting film with respect to a direction of incidence on the second splitting element of the first split beam is opposite to a positional relationship between the first transparent medium and the first splitting film with respect to a direction of incidence of the incident light on the first splitting element.

7 Claims, 9 Drawing Sheets

OTHER PUBLICATIONS

EP Communication, dated Jul. 3, 2009, issued in corresponding EP Application No. 08005533.8, 4 pages.

Thelen, Alfred, "Nonpolarizing interference films inside a glass cube," Applied Optics, Dec. 1976, vol. 15, No. 12, pp. 2983-2985.

* cited by examiner

INTERFEROMETER, DEMODULATOR, AND SPLITTING ELEMENT

BACKGROUND OF THE INVENTION

1. Field of the Invention

The present invention relates to an interferometer, a demodulator including this interferometer, and to a splitting element used in this interferometer.

Priority is claimed on Japanese Patent Application No. 2007-080447, filed on Mar. 27, 2007, the content of which is incorporated herein by reference.

2. Description of the Related Art

Generally in an interferometer, an incident beam of light is split into a plurality of split beams, and after passing through different optical paths the split beams are caused to interfere, and the interference fringes or similar are measured. One type of interferometer is a delayed interferometer, in which, relative to one split beam, another split beam is delayed, and interference is caused. FIG. 11 shows the configuration of a delayed interferometer of the conventional art. The delayed interferometer 100 shown in FIG. 11 is a Michelson-type delayed interferometer, including a beam splitter 101 and planar mirrors 102 and 103

The beam splitter 101 is a plate shape member formed by for example forming a prescribed multilayer dielectric film 101b on glass substrate 101a. This beam splitter 101 both reflects and transmits incident light L100, to split the light into split beams L101 and L102 having a prescribed intensity ratio (for example, 1:1). The beam splitter 101 combines the split beams L101 and L102 after being reflected by the planar mirrors 102 and 103 respectively to cause interference, and also splits the interference light obtained by interference at a prescribed intensity ratio (for example, 1:1). This beam splitter 101 is positioned such that the incident light L100 is incident at a prescribed angle (for example, 45°) on the surface on which the multilayer dielectric film 101b is formed.

The planar mirror 102 is positioned in the optical path of one of the split beams L101 split by the beam splitter 101, such that the reflecting face is perpendicular to the optical path. The planar mirror 102 reflects the split beam L101 from the beam splitter 101 toward the beam splitter 101. The planar mirror 103 is positioned in the optical path of the other split beam L102 split by the beam splitter 101, such that the reflecting face is perpendicular to the optical path. The planar mirror 103 reflects the split beam L102 from the beam splitter 101 toward the beam splitter 101. In the delayed interferometer 100 shown in FIG. 11, the planar mirrors 102 and 103 are positioned such that the optical path length of the split beam L101 is longer by a prescribed length than the optical path length of the split beam L102.

In the above configuration, when the incident light L100 is incident on the delayed interferometer 100, the incident light is split by the beam splitter 101 into split beams L101 and L102. The split beams L101 and L102 are reflected by planar mirrors 102 and 103 respectively, and are again incident on the beam splitter 101. The optical path length of the split beam L101 is longer by a prescribed length than the optical path length of the split beam L102, so that the split beam L101 is delayed by a prescribed length of tine relative to the split beam L102. Then, the split beams L101 and L102 are combined at the beam splitter 101 and caused to interfere, and by this means phase comparison is performed between the split beam L102 and the split beam L101 which is delayed by the above time duration. The interference light having an intensity according to the comparison result is output as output beams L103 and L104.

FIG. 12 shows a modified example of the delayed interferometer of the conventional art shown in FIG. 11. The delayed interferometer 200 shown in FIG. 12 is a Michelson-type delayed interferometer including right-angle prisms 202 and 203 instead of the planar mirrors 102 and 103 shown in FIG. 11. By employing right-angle prisms 202 and 203, the outbound and inbound paths of the split beams L101 and L102 can be shifted (given an offset). Further, the position of emission of the output beam L103 can also be changed relative to the position of incidence of the incident light L100.

The above-described delayed interferometers 100 and 200 are provided in demodulators of WDM (Wavelength Division Multiplexing) optical communication systems, in which optical signals modulated by for example differential phase shift keying (DPSK) or another modulation method are subjected to wavelength division multiplexing (WDM) and transmitted. Differential phase shift keying is a modulation method in which a signal is modulated by relative phase difference with the phase of the preceding signal to perform modulation. When using a delayed interferometer 100 and 200 in a demodulator, by means of the following measure, the modulated light can be demodulated. That is, each of the optical path lengths is set such that the split beam L101 is delayed, relative to the split beam L102, by a time duration equivalent to one bit of the modulation rate of the modulated light. The modulated light is made incident as the incident light L100.

Details of a demodulation device including a delayed interferometer of the conventional art in a WDM optical communication system may for example be found in Published Japanese Translation of PCT Application 2004-516743 (PCT Publication No. WO 02/51041).

Ideally, the beam splitter 101 employed in the delayed interferometers 100 and 200 splits the incident light L100 at a prescribed intensity ratio, regardless of the polarization state of the incident light L100 (S-polarized or P-polarized), and without causing a relative phase difference between the split beams. However, actual beam splitters 101 are not ideal. Hence relative phase differences between the split beams L101 and L102 occur, according to the polarization state of the incident light L100, arising from imperfections in the beam splitter 101.

Due to such phase differences, there is the problem of occurrence of phenomena in which the phase of a delayed interferometer 100 or 200 changes depending on the polarization state of the incident light L100 (PDFS: Polarization-Dependent Frequency Shift). Polarization-dependent frequency shifts (PDFS) are not a problem inherent only in delayed interferometers such as the delayed interferometers 100 and 200 shown in FIG. 11 and FIG. 12, but is a problem which occurs in interferometers in general which employ splitting elements such as half-mirrors, beam splitters, and similar.

SUMMARY OF THE INVENTION

The present invention has been devised in light of the above circumstances. An object of this invention is to provide an interferometer enabling reduction of the polarization-dependent frequency shifts (PDFS) which occur due to imperfections in the beam splitting element, a demodulator including such an interferometer, and a splitting element used in such an interferometer.

In order to attain this object an interferometer of a first aspect of the present invention comprises: a first splitting element which includes a first transparent medium and a first splitting film formed on said first transparent medium, and which splits incident light into a first split beam and a second split beam, the first split beam being the incident light reflected by said first splitting element, and the second split beam being the incident light transmitted through said first splitting element; and a second splitting element which includes a second transparent medium and a second splitting film formed on said second transparent medium, and which causes interference between the first split beam and the second split beam passed through different optical paths, said second splitting element being positioned such that a positional relationship between said second transparent medium and said second splitting film with respect to a direction of incidence on said second splitting element of the first split beam is opposite to a positional relationship between said first transparent medium and said first splitting film with respect to a direction of incidence of the incident light on said first splitting element.

According to the first aspect of the invention, when incident light is incident on the first splitting element, the light is split into a first split beam and a second split beam. The first split beam and the second split beam are incident upon and made to undergo interference by a second splitting element, positioned such that the positional relationship between the second transparent medium and the second splitting film with respect to the direction of incidence of the first split beam on the second splitting element is opposite to the positional relationship between the first transparent medium and the first splitting film with respect to the direction of incidence of the incident light on the first splitting element.

Therefore, the phase difference between the first split beam and the second split beam occurring when the incident light is split by the first splitting element is compensated when the second splitting element causes interference between the first and second split beams.

In the interferometer of the first aspect of the invention, the first transparent medium may have a triangular pole shape, a cross-sectional shape of said first transparent medium is a right isosceles triangle, and said first splitting film is formed on a first side face forming a hypotenuse of said right isosceles triangle; said second transparent medium may have a triangular pole shape, a cross-sectional shape of said second transparent medium is a right isosceles triangle, and said second splitting film is formed on a second side face forming a hypotenuse of said right isosceles triangle; said first splitting element may further include a third transparent medium having a triangular pole shape, a cross-sectional shape of said third transparent medium being a right isosceles triangle, and is formed by laminating a third face forming a hypotenuse of said right isosceles triangle of said third transparent medium, against said first face; and said second splitting element may further include a fourth transparent medium having a triangular pole shape, a cross-sectional shape of said fourth transparent medium being a right isosceles triangle, and may be formed by laminating a fourth face forming a hypotenuse of said right isosceles triangle of said fourth transparent medium, against said second face.

The interferometer of the first aspect of the invention may further comprises a first reflecting member and second reflecting member which respectively reflect the first split beam and the second split beam toward said second splitting element.

In order to attain the above object, an interferometer of a second aspect of the invention comprises a splitting element including: a first splitting portion which splits incident light into a first split beam and a second split beam; and a second splitting portion which causes interference between the first split beam and the second split beam propagated over different optical paths, while compensating a phase difference between the first split beam and the second split beam occurring upon splitting of the incident light by said first splitting portion.

According to the second aspect of the invention, when the incident light is incident on the first splitting portion of the splitting element, the light is split into the first split beam and second split beam, and by causing the first split beam and second split beam to be incident on the second splitting portion of the splitting element, interference occurs with compensation of the phase difference.

In the interferometer of the second aspect of the invention, said splitting element may include a transparent medium having a plate shape, a first splitting film formed in a portion of a top surface of said transparent medium, and a second splitting film formed in a portion of a bottom surface of said transparent medium, said first splitting film and said second splitting film being formed such that there is no mutual overlap when viewed from a direction perpendicular to said top surface and said bottom surface; said first splitting portion may be a portion on which said first splitting film is formed, and said second splitting portion may be a portion on which said second splitting film is formed; and said splitting element may be positioned such that the incident light is incident on said first splitting portion from a side of said top surface, and such that the first split beam that is the incident light reflected by said first splitting portion, is incident on said second splitting portion from the side of said top surface.

In the interferometer of the second aspect of the invention, said splitting element may include a first transparent medium having a triangular pole shape, a cross-sectional shape of said first transparent medium being a right isosceles triangle, and a first splitting film being partially formed on a first side face which forms a hypotenuse of said right isosceles triangle, and a second transparent medium having a triangular pole shape, a cross-sectional shape of said second transparent medium being a right isosceles triangle, and a second splitting film being partially formed on a second side face which forms a hypotenuse of said right isosceles triangle; said splitting element may be formed by laminating said first side face and said second side face such that said first splitting film and said second splitting film do not overlap; said first splitting portion may be a portion on which said first splitting film is formed, and said second splitting portion is a portion on which said second splitting film is formed; and said splitting element may be positioned such that a positional relationship between said second transparent medium and said second splitting film in said second splitting portion with respect to a direction of incidence on said second splitting portion of the first split beam that is the incident light reflected by said first splitting portion, is opposite to a positional relationship between said first transparent medium and said first splitting film in said first splitting portion with respect to a direction of incidence on said first splitting portion of the incident light.

The interferometer of the second aspect of the invention may further comprises a first reflecting member and a second reflecting member which respectively reflect the first split beam and the second split beam propagating over different optical paths, toward said second splitting portion.

A demodulator of a third aspect of the present invention, which demodulates an optical signal modulated by a differential phase shift-keying, comprises: an interferometer of the first or second aspect of the invention in which a difference in optical path lengths of the first split beam and the second split beam is set such that the first split beam is delayed relative to the second split beam by a time duration equivalent to one bit of a modulation rate of the optical signal; and a photodetector which receives interference light obtained from said interferometer and generates a demodulated signal.

A splitting element which splits incident light of a fourth aspect of the invention comprises: a transparent medium having plate shape; a first splitting film formed in a portion of a top surface of said transparent medium; and a second splitting film formed in a portion of a bottom surface of said transparent medium, said first and second splitting films being formed such that there is no mutual overlap when viewed from a direction perpendicular to said top surface and said bottom surface.

A splitting element which splits incident light of a fifth aspect of the invention comprises: a first transparent medium having a triangular pole shape, a cross-sectional shape of said first transparent medium being a right isosceles triangle, and a first splitting film being partially formed on a first side face which forms a hypotenuse of said right isosceles triangle; and a second transparent medium having a triangular pole shape, a cross-sectional shape of said second transparent medium being a right isosceles triangle, and a second splitting film being partially formed on a second side face which forms a hypotenuse of said right isosceles triangle, said splitting element being formed by laminating said first side face and said second side face such that said first splitting film and said second splitting film do not overlap.

According to the invention, the phase difference between split light beams occurring when incident light is split by a splitting element is compensated when the split beams are combined by a splitting element, so that there is the advantageous result that polarization-dependent frequency shift (PDFS) arising due to imperfection of the splitting element can be reduced.

DETAILED DESCRIPTION OF THE INVENTION

Figure 1:
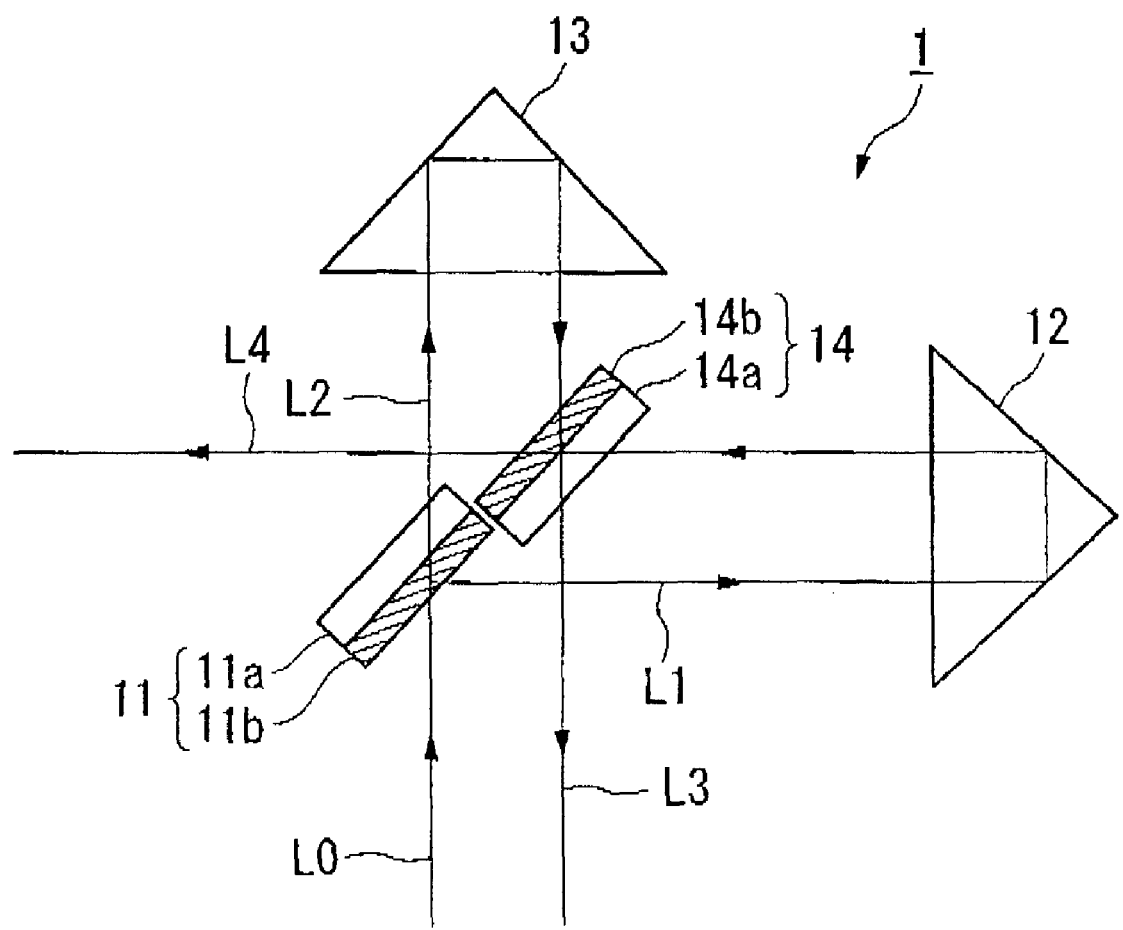
FIG. 1 shows the configuration of principal portions of the interferometer of a first embodiment of the invention.

Below, interferometers, demodulators, and splitting elements of embodiments of the present invention are described in detail, referring to the drawings.

First Embodiment

FIG. 1 shows the configuration of principal portions of the interferometer of a first embodiment of the invention. As shown in FIG. 1, the interferometer 1 of this embodiment is a Michelson-type delayed interferometer including a beam splitter 11 (first splitting element), right-angle prism mirrors 12 and 13 (reflecting members), and a beam splitter 14 (second splitting element).

The beam splitter 11 employs a plate shape transparent substrate 11a (transparent medium), and a splitting film 11b formed on one surface of the transparent substrate 11a. The beam splitter 11 splits incident light L0 into a split beam L1 (first split beam) and split beam L2 (second split beam) with a prescribed intensity ratio (for example, 1:1). The transparent substrate 11a is a glass substrate formed for example from BK7, which is one kind of glass. The splitting film 11b is a thin film which is for example a multilayer dielectric film, a metal thin film, or a combination of a multilayer dielectric film and a metal thin film.

The right-angle prism mirror 12 has a triangular pole shape, the cross-sectional shape of which is a right isosceles triangle, and is a mirror with two perpendicular surfaces as reflecting faces. The reflecting faces reflect the split beam L1 that is the incident light L0 reflected by the beam splitter 11, toward the beam splitter 14 with the optical path shifted. That is, the outbound path of the split beam L1 from the beam splitter 11 toward the right-angle prism mirror 12, and the inbound path of the split beam L1 from the right-angle prism mirror 12 toward the beam splitter 14, are different optical paths.

Similarly to the right-angle prism mirror 12, the right-angle prism mirror 13 has a triangular pole shape, the cross-sectional shape of which is a right isosceles triangle, and is a mirror with two perpendicular surfaces as reflecting faces. The reflecting faces reflect the split beam L2, that is the incident light L0 transmitted through the beam splitter 11, toward the beam splitter 14 with the optical path shifted. That is, the outbound path of the split beam L2 from the beam splitter 11 toward the right-angle prism mirror 13, and the inbound path of the split beam L2 from the right-angle prism mirror 13 toward the beam splitter 14, are different optical paths.

The beam splitter 14 is formed by a plate shape transparent substrate 14a (transparent medium) and a splitting film 14b, formed on one face of the transparent substrate 14a. The beam splitter 14 combines and causes interference between the split beams L1 and L2, reflected by the right-angle prism mirrors 12 and 13 respectively. Also, the beam splitter 14 splits the interference light obtained by interference into an interference beam L3 and an interference beam L4 with a prescribed intensity ratio (for example, 1:1). These interference beams L3 and L4 are emitted to the outside. Similarly to the transparent substrate 11a, the transparent substrate 14a is a glass substrate formed from for example BK7, which is one type of glass. The splitting film 14b is a thin film which is for example a multilayer dielectric film, a metal thin film, or a combination of a multilayer dielectric film and a metal thin film. The splitting film 14b has the same structure as the split film 11b formed on the transparent substrate 11a of the beam splitter 11. The splitting film 14b has reflecting and transmitting characteristics similar to (and preferably identical to) those of the splitting film 11b.

The beam splitter 14 is positioned such that the positional relationship between the transparent substrate 14a and the splitting film 14b with respect to the direction of incidence on the beam splitter 14 of the split beam L1 is opposite to the positional relationship between the transparent substrate 11a and the splitting film 11b with respect to the direction of incidence on the beam splitter 11 of the incident light L0. That is, referring to FIG. 1, the beam splitter 11 is positioned in a positional relationship such that incident light L0 is first incident on the splitting film 11b, and then the split beam L2 that is the incident light L0 transmitted through the splitting film 11b is incident on the transparent substrate 11a. On the other hand, the beam splitter 14 is positioned such that the split beam L1 that is the incident light L0 reflected by the beam splitter 11 is first incident on the transparent substrate 14a, and is then incident on the splitting film 14b.

The beam splitter 14 is positioned with respect to the beam splitter 11 as described above, in order that the phase difference between the split beams L1 and L2, arising from splitting of the incident light L0 by the beam splitter 11, is compensated when the split beams L1 and L2 are caused to interfere at the beam splitter 14. If this phase difference is compensated, then the phenomenon in which the phase of the interferometer 1 changes depending on the polarization state of the incident light (PDFS: polarization-dependent frequency shift) can be reduced.

Figure 2A:
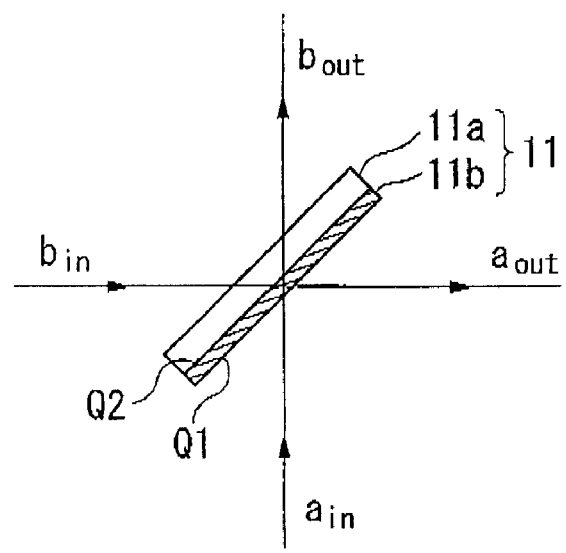
FIG. 2A is a figure used to explain characteristics of the interferometer of the first embodiment of the invention.
Figure 2B:
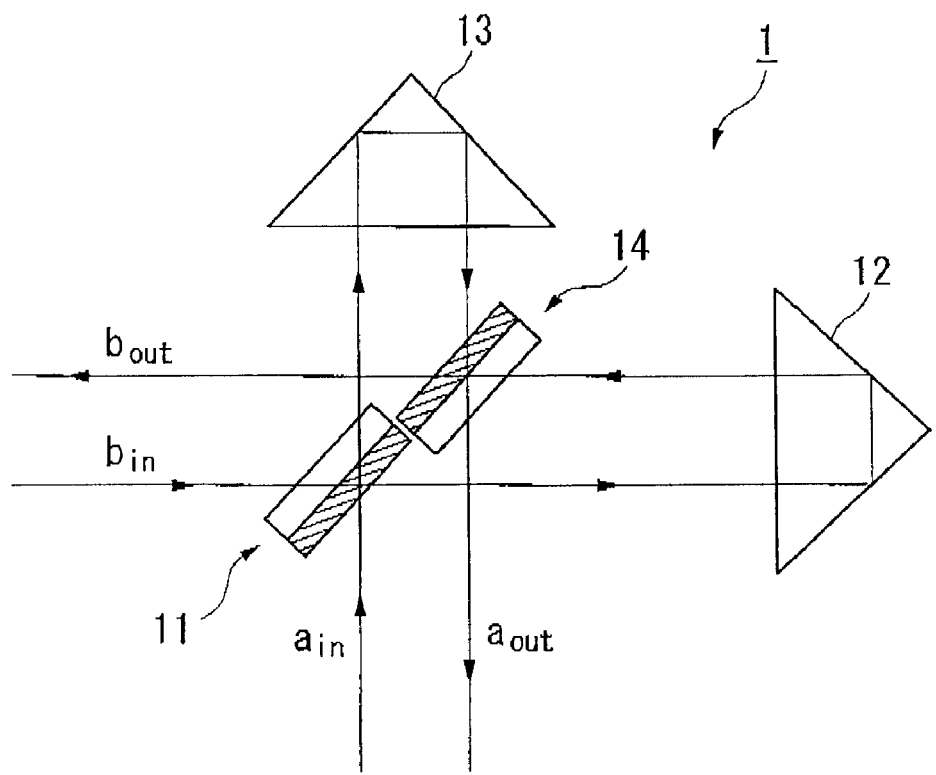
FIG. 2B is a figure used to explain characteristics of the interferometer of the first embodiment of the invention.

Next characteristics of the interferometer 1, when the beam splitters 11 and 14 are positioned as described above, are explained. FIG. 2A and FIG. 2B are figures used to explain the characteristics of the interferometer 1 of the first embodiment of the invention as shown in FIG. 2A, the two incident beams incident on the beam splitter 11 are $a_{in}$ and $b_{in}$ and the two emission beams emitted from the beam splitter 11 are $a_{out}$ and $b_{out}$. Then, the relation between these incident beams and emission beams is expressed by equation (1) below.

$$\begin{pmatrix} a_{out} \\ b_{out} \end{pmatrix} = \begin{pmatrix} r_{11} & t_{21} \\ t_{12} & r_{22} \end{pmatrix} \begin{pmatrix} a_{in} \\ b_{in} \end{pmatrix} \quad (1)$$

Here, the variable $r_{11}$ in equation (1) is the amplitude reflectance on the side of the surface Q1 of the splitting film 11b. The variable $t_{12}$ is the amplitude transmittance on the side of the surface Q1 of the splitting film 11b. The variable $t_{21}$ is the amplitude transmittance on the side of the surface Q2 of the splitting film 11b. The variable $r_{22}$ is the amplitude reflectance on the side of the surface Q2 of the splitting film 11b.

The amplitude reflectances $r_{11}$, $r_{22}$ and amplitude transmittances $t_{12}$, $t_{21}$ are expressed by equation (2) below.

$$t_{12}=t_{21}=\sqrt{T}$$
$$r_{11}=i\sqrt{R}e^{i\alpha}$$
$$r_{22}=i\sqrt{R}e^{i\alpha} \quad (2)$$

The variables R and T in equation (2) are the intensity reflectance and intensity transmittance of the beam splitter 11 respectively, and the relation R+T=1 obtains. The variable $\alpha$ is the phase difference of reflected light taking as reference transmitted light, occurring at the beam splitter 11. If the beam splitter 11 were ideal, then the phase difference $\alpha$ would be "0". The value of this phase difference $\alpha$ is determined by the construction of the beam splitter 11. The value of the phase difference $\alpha$ varies depending on the polarization state of the incident light. The phase shift occurring in actual beam splitters 11 is thought to occur either in transmitted light or in reflected light, or in both. However, here, for simplicity, it is assumed that no phase shift occurs in transmitted light, and that a phase shift occurs only in reflected light.

It is assumed that there are no losses when the incident beams a<, and be pass through the beam splitter 11, and the energy conservation law stipulating that $|a_{in}|^2+|b_{in}|^2=|a_{out}|^2+|b_{out}|^2$ is considered. As a result, the relation expressed by equation (3) below between the amplitude reflectances $r_{11}$, $r_{22}$ and the amplitude transmittances $t_{12}$, $t_{21}$ is obtained $$|r_{11}|^2+|t_{12}|^2=1$$
$$|r_{22}|^2+|t_{21}|^2=1$$
$$r_{11}t_{12}*+t_{21}r_{22}*=0 \quad (3)$$

In equation (3), the variable $t_{12}*$ is the complex conjugate of the amplitude transmittance $t_{12}$. The variable $r_{22}*$ is the complex conjugate of the amplitude reflectance $r_{22}$.

Next, the interferometer 1 is considered FIG. 2B is a simplified diagram of the interferometer 1. As shown in FIG. 2B, the two incident beams incident on the beam splitter $$\begin{pmatrix} a_{out} \\ b_{out} \end{pmatrix} = \begin{pmatrix} r_{11} & t_{21} \\ t_{12} & r_{22} \end{pmatrix} \begin{pmatrix} e^{-ikL_1} & 0 \\ 0 & e^{-ikL_2} \end{pmatrix} \begin{pmatrix} r_{11} & t_{21} \\ t_{12} & r_{22} \end{pmatrix} \begin{pmatrix} a_{in} \\ b_{in} \end{pmatrix} \quad (4)$$

$$= e^{-ik\frac{L_1+L_2}{2}} \begin{pmatrix} r_{11}^2 e^{-i\Delta\phi} + t_{12}t_{21}e^{i\Delta\phi} & t_{21}r_{11}e^{-i\Delta\phi} + t_{12}r_{22}e^{i\Delta\phi} \\ t_{12}r_{11}e^{-i\Delta\phi} + t_{12}r_{22}e^{i\Delta\phi} & t_{12}t_{21}e^{-i\Delta\phi} + r_{22}^2 e^{i\Delta\phi} \end{pmatrix} \begin{pmatrix} a_{in} \\ b_{in} \end{pmatrix}$$

Figure 11:
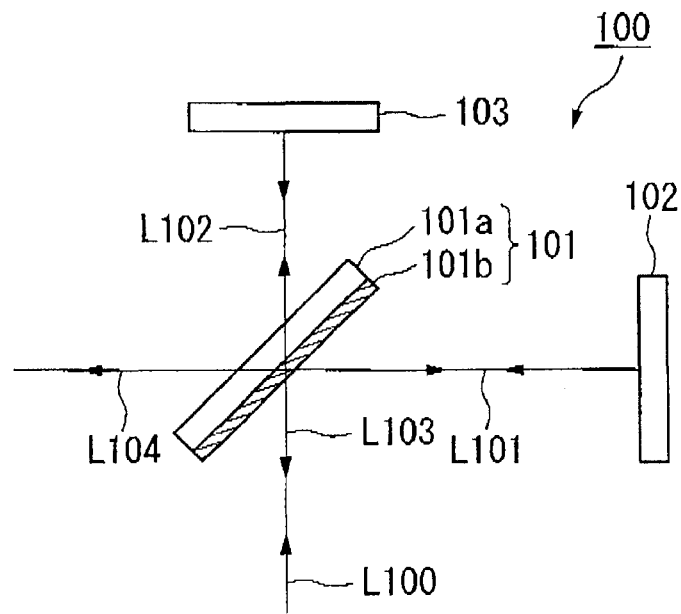
FIG. 11 shows the configuration of a delayed interferometer of the conventional art; and, FIG. 12 shows a modified example of the delayed interferometer of the conventional art show in FIG. 11.
Figure 12:
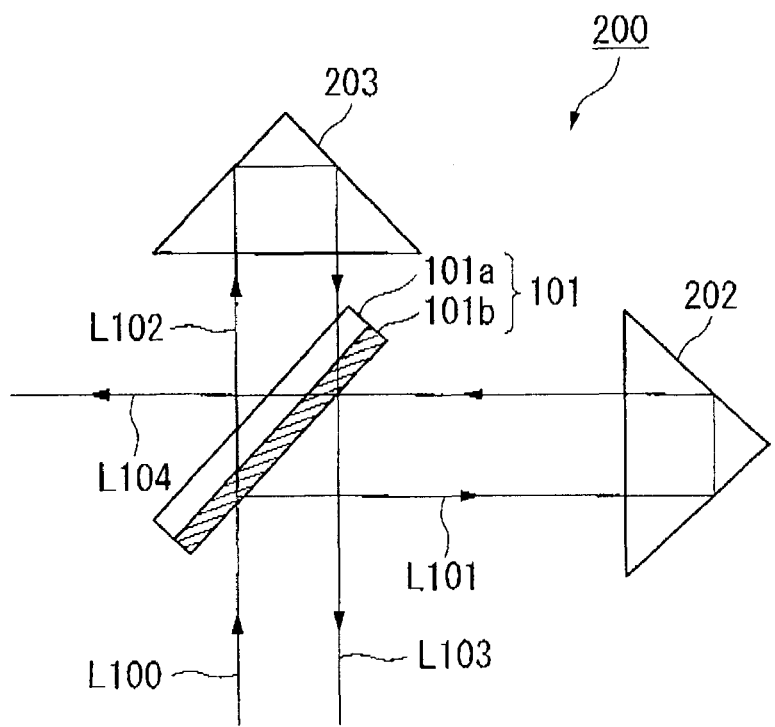

11 are $a_{in}$ and $b_{in}$. The emission beam emitted in the direction opposite to the direction of incidence of incident beam $a_{in}$ is $a_{out}$. The emission beam emitted in the direction opposite to the direction of incidence of incident beam $b_{in}$ is $b_{out}$. In place of the beam splitters 11 and 14 in FIG. 2B, the beam splitter 101 shown in FIG. 11 is positioned, and characteristics of an interferometer 100 of the conventional art are considered. The relation between the incident beams and emission beams in an interferometer 100 of the conventional art is given by the following equation (4).

In equation (4), the variable k is the wave number of the incident beams $a_{in}$ and $b_{in}$ and of the emission beams $a_{out}$ and $b_{out}$. $L_1$ and $L_2$ are the optical path lengths of the optical paths of the split beams L101 and L102 respectively. The variable $\Delta\phi$ is the phase difference of the split beam L1 with the split beam L2 arising from the optical path length difference for the split beams L101 and L102, and is expressed by equation (5) below.

$$\Delta\phi = k\frac{L_1 - L_2}{2} = k\frac{\Delta L}{2} = \pi\frac{\Delta L}{\lambda} = \pi f\frac{\Delta L}{c} = \pi f T_d = \pi\frac{f}{FSR} \quad (5)$$

In equation (5), c is the speed of light, and the variables λ and f are the wavelength and frequency of the incident light $a_{in}$ and $b_{in}$ and of the emitted light $a_{out}$ and $b_{out}$. The variable $T_d$ is the delay time of the split beam L1 relative to the split beam L2. The variable FSR is the free spectral range of the interference light obtained by causing interference of the split beams L1 and L2.

When, in accordance with the interferometer 100 shown in FIG. 11, the incident beam $b_{in}$ is set to 0, the power $P_a$ and $P_b$ of the interference beams L103 and L104 are as given by equations (6) below.

$$P_a \equiv \left|\frac{a_{out}}{a_{in}}\right|^2 = |r_{11}^2 e^{-i\Delta\phi} + t_{12}t_{21}e^{i\Delta\phi}|^2 \quad (6)$$

$$= R^2\left|-e^{i2\alpha}e^{-i\Delta\phi} + \frac{T}{R}e^{i\Delta\phi}\right|^2$$

$$P_b \equiv \left|\frac{b_{out}}{a_{in}}\right|^2 = |t_{12}r_{11}e^{-i\Delta\phi} + t_{12}r_{22}e^{i\Delta\phi}|^2$$

$$= TR|e^{i2\alpha}e^{-i\Delta\phi} + e^{i\Delta\phi}|^2$$

The above equations (6) contain terms with the factor $e^{i2\alpha}$, and it is seen that this gives rise to the polarization-dependent frequency shift (PDFS) causing changes in the phase of the interferometer 100. That is, the existence of PDFS in an interferometer 100 of the conventional art is due not simply to the fact that the phase term $e^{i2\alpha}$ remains, but to the fact that the phase term $e^{i2\alpha}$ remains, and moreover the parameter α changes depending on the polarization state (S polarization or P polarization).

When using a technique similar to that used above for an interferometer 100 of the conventional art, the relation between incident beams and emission beams for the interferometer 1 of this embodiment can be expressed using equation (7) below.

$$\begin{pmatrix}a_{out}\\b_{out}\end{pmatrix} = \begin{pmatrix}r_{11} & t_{21}\\t_{12} & r_{22}\end{pmatrix}\begin{pmatrix}e^{-ikL_1} & 0\\0 & e^{-ikL_2}\end{pmatrix}\begin{pmatrix}r_{22} & t_{12}\\t_{21} & r_{11}\end{pmatrix}\begin{pmatrix}a_{in}\\b_{in}\end{pmatrix} \quad (7)$$

$$= e^{-ik\frac{L_1+L_2}{2}}\begin{pmatrix}r_{11}r_{22}e^{-i\Delta\phi} + t_{21}^2 e^{i\Delta\phi} & r_{11}t_{12}e^{-i\Delta\phi} + t_{21}r_{11}e^{i\Delta\phi}\\t_{12}r_{22}e^{-i\Delta\phi} + r_{22}r_{21}e^{i\Delta\phi} & t_{12}^2 e^{-i\Delta\phi} + r_{11}r_{22}e^{i\Delta\phi}\end{pmatrix}\begin{pmatrix}a_{in}\\b_{in}\end{pmatrix}$$

Here, it is assumed that the optical path length of the split beam L1 is equal to the optical path length $L_1$ of the split beam L101, and the optical path length of the split beam L2 is equal to the optical path length $L_2$ of the split beam L102. The phase difference $\Delta\phi$ in equation (7) is expressed by the above equation (5).

If, in accordance with the interferometer 1 shown in FIG. 1, the incident beam $b_{in}$ is set to 0, the power $P_a$ and $P_b$ of the interference beams L3 and L4 are as given by equations (8) below.

$$P_a \equiv \left|\frac{a_{out}}{a_{in}}\right|^2 = |r_{11}r_{22}e^{-i\Delta\phi} + t_{21}^2 e^{i\Delta\phi}|^2 \quad (8)$$

$$= R^2\left|-e^{-i\Delta\phi} + \frac{T}{R}e^{i\Delta\phi}\right|^2$$

$$P_b \equiv \left|\frac{b_{out}}{a_{in}}\right|^2 = |t_{12}r_{22}e^{-i\Delta\phi} + r_{22}t_{21}e^{i\Delta\phi}|^2$$

$$= TR|e^{-i\Delta\phi} + e^{i\Delta\phi}|^2$$

Comparing equations (8) and equations (6) above, it is seen that in equations (8) the terms in $e^{i2\alpha}$ which exist in equations (6) have disappeared. From this it is seen that the phase difference of the reflected beam relative to the transmitted beam, which occurs at the beam splitter 11, is eliminated, and that the polarization-dependent frequency shift (PDFS) causing changes in the phase of the interferometer 1 is eliminated.

Figure 3A:
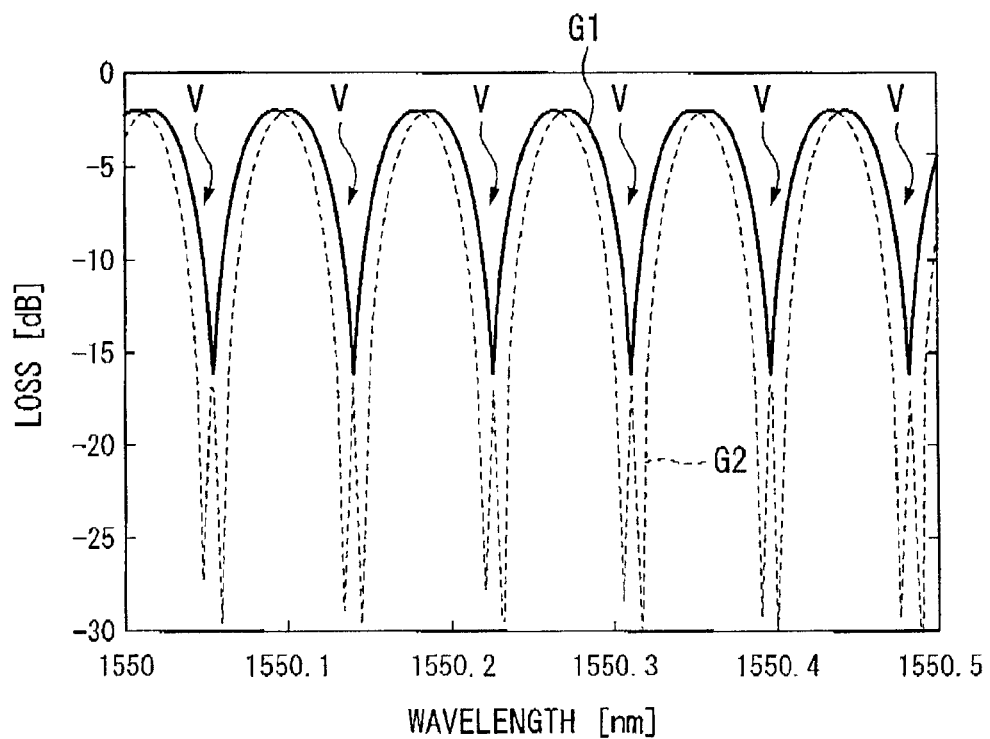
FIG. 3A shows an example of transmission characteristics of an interferometer of the conventional art.
Figure 3B:
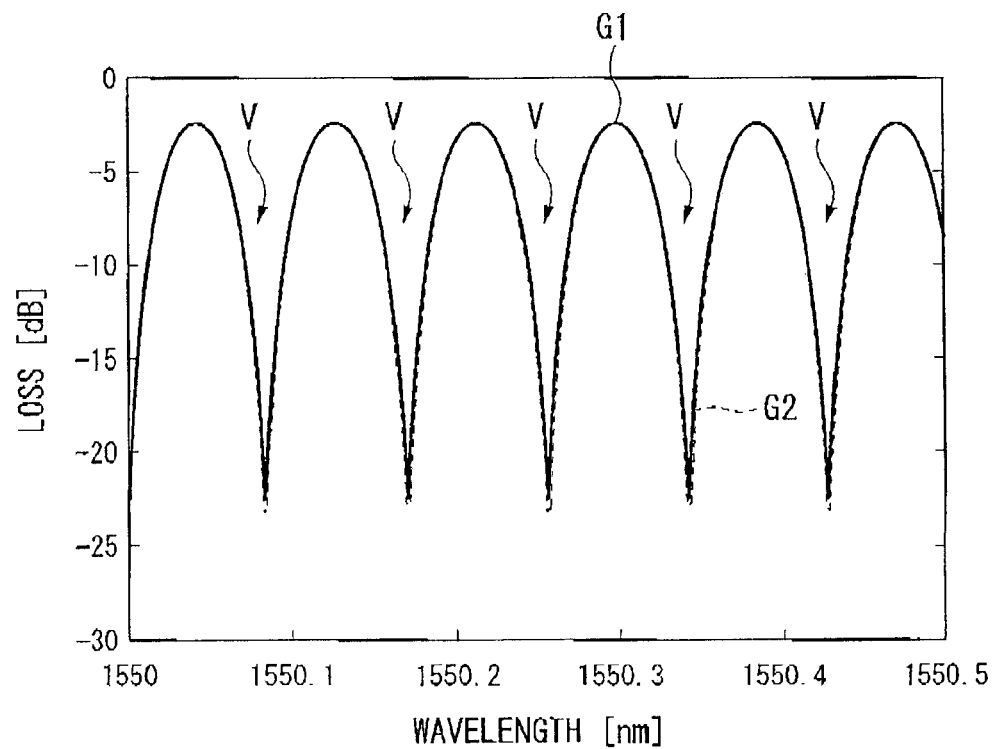
FIG. 3B shows an example of transmission characteristics of the interferometer of the first embodiment.

FIG. 3A shows an example of the transmission characteristics of an interferometer 100 of the conventional art. FIG. 3B shows an example of the transmission characteristics of the interferometer 1 of the first embodiment. The transmission characteristics shown in FIG. 3A are the transmission characteristics of an interferometer 100 when incident light with a random polarization state is made incident on the interferometer 100, while varying the wavelength. The transmission characteristics shown in FIG. 3B are the transmission characteristics of the interferometer 1 when incident light with a random polarization state is made incident on the interferometer 1 while varying the wavelength. In FIG. 3A and FIG. 3B, the horizontal axis indicates the wavelength, and the vertical axis indicates the loss. In FIG. 3A and FIG. 3B, portions denoted by arrows indicated by the symbol "V" are "nodes" at which split beams weaken each other.

In FIG. 3A and FIG. 3B, curves indicated by the symbol G1 indicate the maximum transmittance of the interferometers 100 and 1 when incident light in a random polarization state is made incident on the interferometers 100 and 1. Curves indicated by the symbol G2 indicate the minimum transmittance of the interferometers 100 and 1 when incident light in a random polarization state is made incident on the interferometers 100 and 1.

Referring to FIG. 3A, it is seen that a difference occurs between the maximum transmittance G1 and the minimum transmittance G2 of the interferometer 100 of the conventional art over nearly the entire wavelength range from 1550 to 1550.5 nm. Moreover, this difference is large in the portions of the nodes V. This is thought to be attributed to the following reason. Incident light in a random polarization state is made incident on the beam splitter 11. For this reason, a phase difference occurs between the split beams L1 and L2 according to the polarization state. The split beams L1 and L2 weaken each other to the extent of this phase difference.

On the other hand, referring to FIG. 3B, the maximum transmittance G1 and minimum transmittance G2 are substantially equal for the interferometer 1 of this embodiment over nearly the entire wavelength range from 1550 to 1550.5 nm. This is thought to be attributed to the fact that the phase difference between the split beams L1 and L2 is compensated by the beam splitter 14, so that the amount of mutual weakening of the split beams L1 and L2 is reduced.

As explained above, by means of the interferometer 1 of this embodiment, polarization-dependent frequency shift (PDFS) of the interferometer 1 due to imperfection of the beam splitter 11 can be reduced as follows. That is, the beam splitter 14 is positioned such that the positional relationship between the transparent substrate 14a and splitting film 14b with respect to the direction of incidence on the beam splitter 14 of the split beam L1 is opposite to the positional relationship between the transparent substrate 11a and splitting film 11b of the beam splitter 11 with respect to the direction of incidence on the beam splitter 11 of the incident light L0. By this means, the phase difference between the split beams L1 and L2 occurring upon splitting of the incident light L0 by the beam splitter 11 is compensated.

In FIG. 1, a case is shown in which the beam splitter 11 and beam splitter 14 are positioned as follows. That is, the beam splitter 11 is positioned in a positional relationship such that the incident light L0 is initially incident on the splitting film 11b, and then the split beam L2 that is the incident light L0 passed through the splitting film 11b is incident on the transparent substrate 11a. Moreover, the beam splitter 14 is positioned in a positional relationship such that the split beam L1 that is the incident light L0 reflected by the beam splitter 11 is first incident on the transparent substrate 14a, and is then incident on the splitting film 14b. However, the beam splitters 11 and 14 may be positioned such that the positional relationship of the transparent substrate 11a and splitting film 11b of the beam splitter 11 with respect to the incident light L0, and the positional relationship of the transparent substrate 14a and splitting film 14b of the beam splitter 14 with respect to the split beam L1, are each the opposite of the above.

Second Embodiment

Figure 4:
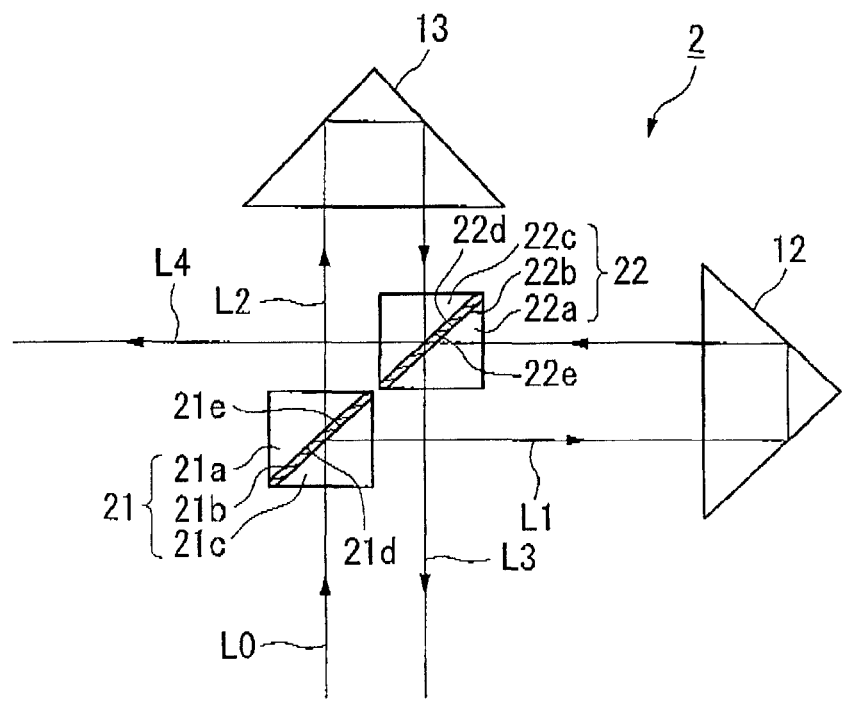
FIG. 4 shows the configuration of principal portions of the interferometer of a second embodiment of the invention.

Next, the interferometer of a second embodiment of the invention is explained. FIG. 4 shows the configuration of principal portions of the interferometer of the second embodiment of the invention. In FIG. 4, members which are the same as members shown in FIG. 1 are assigned the same symbols. As shown in FIG. 4, the interferometer 2 of this embodiment is a Michelson-type delayed interferometer including, in place of the beam splitters 11 and 14 of FIG. 1, beam splitters 21 and 22.

The beam splitter 21 has a transparent medium 21a, and a transparent medium 21c (second transparent medium) with the same shape as the transparent medium 21a. The transparent medium 21a has a triangular pole shape, the cross-sectional shape of which is a right isosceles triangle. On the side face 21d of the transparent medium 21a forming the hypotenuse of the right isosceles triangle (i.e., the side face containing the hypotenuse of the bottom face of the triangular pole as an edge, or the side face containing the hypotenuse of the right isosceles triangle of a cross-section) is formed a splitting film 21b. The beam splitter 21 is formed by laminating the side face 21e of the transparent medium 21c against the side face 21d of the transparent medium 21a on which the splitting film 21b is formed.

This beam splitter 21, similarly to the beam splitter 11 shown in FIG. 1, splits the incident beam L0 into a split beam L1 (first split beam) and split beam L2 (second split beam) with a prescribed intensity ratio (for example, 1:1). The transparent mediums 21a and 21c are formed from, for example, BK7, which is one type of glass. The splitting film 21b is a thin film which is for example a multilayer dielectric film, a metal thin film, or a combination of a multilayer dielectric film and a metal thin film.

The beam splitter 22 is of construction similar to that of the beam splitter 21. The beam splitter 22 combines and causes interference between the split beams L1 and L2, which have been reflected by the right-angle prism mirrors 12 and 13 respectively. Further, the beam splitter 22 splits the interference light obtained by interference into an interference beam L3 and interference beam L4 with a prescribed intensity ratio (for example, 1:1). Specifically, the beam splitter 22 has a transparent medium 22a, and a transparent medium 22c (second transparent medium) with the same shape as the transparent medium 22a. The cross-sectional shape of the transparent medium 22a is a right isosceles triangle. The splitting film 22b is formed on the side face 22d of the transparent medium 22a forming the hypotenuse of the right isosceles triangle. The beam splitter 22 is formed by laminating the side face 22e of the transparent medium 22c to the side face 22d on which the splitting film 22b of the transparent medium 22a is formed.

Similarly to the transparent mediums 21a and 21c of the beam splitter 21, the transparent mediums 22a and 22c are for example formed from BK7, which is a type of glass. The splitting film 22b is a thin film which is for example a multilayer dielectric film, a metal thin film, or a combination of a multilayer dielectric film and a metal thin film. The splitting film 22b of the beam splitter 22 has the same construction as the splitting film 21b of the beam splitter 21. The beam splitters 21 and 22 have similar (and preferably identical) reflection and transmission characteristics.

The beam splitter 22 is positioned such that the positional relationship between the transparent medium 22a and the splitting film 22b with respect to the direction of incidence on the beam splitter 22 of the split beam L1 that is the incident light L0 reflected by the beam splitter 21 is opposite to the positional relationship between the transparent medium 21a and the splitting film 21b of the beam splitter 21 with respect to the direction of incidence on the beam splitter 21 of the incident light L0. In other words, the beam splitter 21 is positioned in a positional relationship in which incident light L0 is first incident on the splitting film 21b after passing through the transparent medium 21c laminated onto the transparent medium 21a, and then the split beam L2 that is the incident light L0 passed through the splitting film 21b is incident on the transparent medium 21a. On the other hand, the beam splitter 22 is positioned in a positional relationship in which the split beam L1 that is the incident light L0 reflected by the beam splitter 21 is first incident on the transparent medium 22a, and is then incident on the splitting film 22b, and the light that is the split beam L1 passed through the splitting film 22b (a fraction of the interference beam L4) passes through the transparent medium 22c laminated onto the transparent medium 22a.

The position of the beam splitter 22 relative to the beam splitter 21 is as described above. Hence similarly to the interferometer 1 of the first embodiment, in the interferometer 2 of this embodiment the phase difference between the split beams L1 and L2, occurring when the incident light L0 is split by the beam splitter 21, can be compensated when causing interference of the split beams L1 and L2 at the beam splitter 22. As a consequent, the polarization-dependent frequency shift (PDFS) of the interferometer 2 can likewise be reduced.

In this embodiment also, similarly to the interferometer 1 of the first embodiment, the beam splitters 21 and 22 may also be positioned such that the positional relationship of the transparent medium 21a and splitting film 21b of the beam splitter 21 with respect to the direction of incidence on the beam splitter 21 of the incident light L0, and the positional relationship of the transparent medium 22a and splitting film 22b of the beam splitter 22 with respect to the direction of incidence on the beam splitter 22 of the split beam L1, are each the opposite of the above.

Third Embodiment

Figure 5:
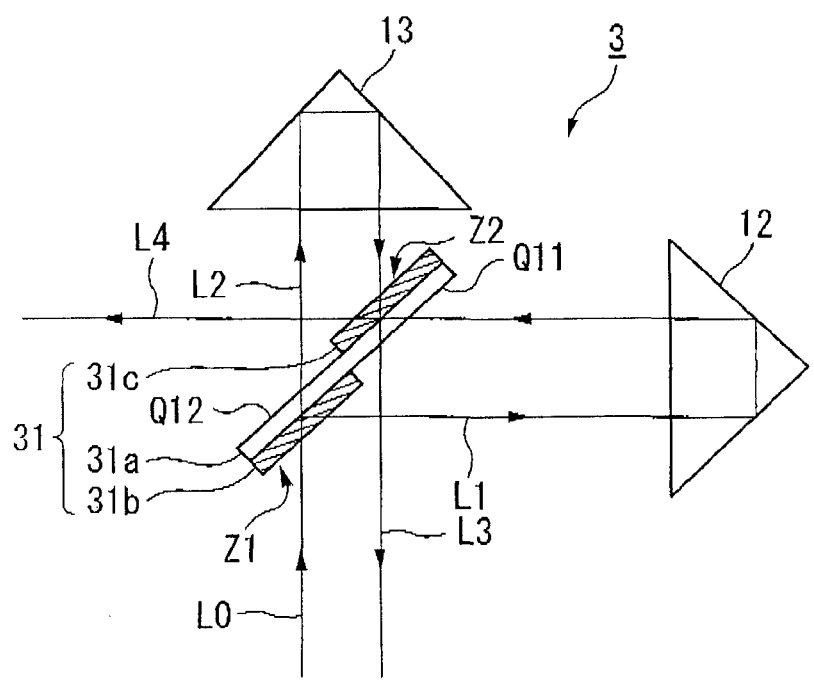
FIG. 5 shows the configuration of principal portions of the interferometer of a third embodiment of the invention.

Next, the interferometer of a third embodiment of the invention is explained. FIG. 5 shows the configuration of principal portions of the interferometer of the third embodiment of the invention. In FIG. 5 also, members which are the same as members shown in FIG. 1 are assigned the same symbols. As shown in FIG. 5, the interferometer 3 of this embodiment is a Michelson-type delayed interferometer which includes a beam splitter 31 (splitting element) in place of the beam splitters 11 and 14 of FIG. 1.

The beam splitter 31 includes a plate shape transparent substrate 31a (transparent medium) and splitting films 31b and 31c. The splitting films 31b and 31c are formed on the top surface Q11 and on the bottom surface Q12 respectively of the transparent substrate 31a. The transparent substrate 31a is a glass substrate formed for example from BK7, which is a kind of glass. The splitting films 31b and 31c are thin films which are for example multilayer dielectric films, metal thin films, or combinations of a multilayer dielectric film and a metal thin film. The splitting film 31b and splitting film 31c have the same construction.

The splitting films 31b and 31c are formed on portions of the top surface Q11 and bottom surface Q12 respectively of the transparent substrate 31a, such that there is no mutual overlap when viewed in the direction perpendicular to the top surface Q11 and bottom surface Q12. The portion of the top surface Q11 of the transparent substrate 31a on which the splitting film 31b is formed is called the first splitting portion Z1. The portion of the bottom surface Q12 of the transparent substrate 31a on which the splitting film 31c is formed is called the second splitting portion Z2. The first splitting portion Z1 and second splitting portion Z2 have similar (and preferably identical) reflecting and transmitting characteristics.

More specifically, for example, the splitting films 31b and 31c are formed as follows. That is, the splitting film 31b is formed on the top surface Q11 on one side in the width direction of the transparent substrate 31a (the direction parallel to the plane of the paper in FIG. 5), extending from the top edge to the bottom edge of the transparent substrate 31a, with a fixed width in the axial direction (the direction perpendicular to the plane of the paper in FIG. 5). The splitting film 31c is formed on the bottom surface Q12 on the other side in the width direction of the transparent substrate 31a, extending from the top edge to the bottom edge of the transparent substrate 31a, with a fixed width in the axial direction, such that there is no overlap with the splitting film 31b when viewed in the direction perpendicular to the top surface Q11 and bottom surface Q12 of the transparent substrate 31a.

However, even if there is partial overlap of the splitting films 31b and 31c, it would be no problem if adequate portions of the splitting films 31b and 31c are secured which do not mutually overlap in the direction perpendicular to the top surface Q11 and bottom surface Q12 of the transparent substrate 31a. Here, the portion of the top surface Q11 of the transparent substrate 31a on which the splitting film 31b is formed, excluding any portion in which the splitting films 31b and 31c overlap, is called the first splitting portion Z1. On the other hand, the portion of the bottom surface Q12 of the transparent substrate 31a on which the splitting film 31c is formed, excluding any portion in which the splitting films 31b and 31C overlap, is called the second splitting portion Z2.

The beam splitter 31 is positioned such that incident light L0 is incident on the first splitting portion Z1 from the side of the top surface Q11 of the transparent substrate 31a, and the split beam L1 that is the incident light L0 reflected by the first splitting portion Z1 is incident on the second splitting portion Z2 from the side of the top surface Q11 of the transparent substrate 31a. In other words, the beam splitter 31 is positioned in a positional relationship such that incident light L0 is incident on the splitting film 31b in the first splitting portion Z1, and then the split beam L2 that is the incident light passed through the splitting film 31b is incident on the transparent substrate 31a. Moreover, the beam splitter 31 is positioned in a positional relationship such that the split beam L1 that is the incident light L0 reflected by the first splitting portion 21, is incident on the transparent substrate 31a, and is then incident on the splitting film 31c in the second splitting portion Z2. The beam splitter 31 may also be positioned such that the top surface Q11 and bottom surface Q12 are the opposite of the above.

This beam splitter 31 splits the incident light L0, incident on the first splitting portion Z1, into a split beam L1 (first split beam) and split beam L2 (second split beam) with a prescribed intensity ratio (for example, 1:1). The beam splitter 31 combines and causes interference between the split beam L1 reflected by the right-angle prism mirror 12 and is incident on the second splitting portion Z2, and the split beam L2 reflected by the right-angle prism mirror 13 and is incident on the second splitting portion Z2. Further, the beam splitter 31 splits the interference light obtained by interference into an interference beam L3 and an interference beam LA with a prescribed intensity ratio (for example, 1:1).

As explained above, in this embodiment, a beam splitter 31 is used in which splitting films 31b and 31c are formed on portions of the top surface Q11 and bottom surface Q12 respectively of a transparent substrate 31a. Hence the positional relationship between the transparent substrate 31a and the splitting film 31b of the beam splitter 31 with respect to the direction of incidence of incident light L0 on the first splitting portion Z1, and the positional relationship between the transparent substrate 31a and the splitting film 31c of the beam splitter 31 with respect to the direction of incidence on the second splitting portion Z2 of the split beam L1, can be opposite.

By this means, in the interferometer 3 of this embodiment the phase difference between the split beam L1 and the split beam L2, occurring upon splitting of the incident light L0 by the first splitting portion Z1 of the beam splitter 31, can be compensated when interference is caused between the split beam L1 and split beam L2 at the second splitting portion Z2 of the beam splitter 31. Hence in the interferometer 3 of this embodiment also, polarization-dependent frequency shift (PDFS) of the interferometer 3 can be reduced.

Fourth Embodiment

Figure 6:
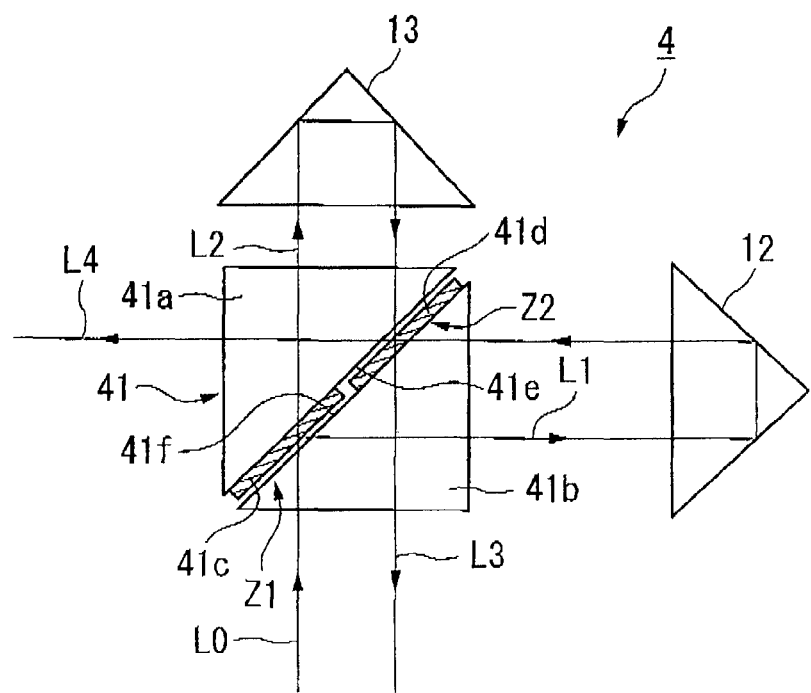
FIG. 6 shows the configuration of principal portions of the interferometer of a fourth embodiment of the invention.

Next, the interferometer of a fourth embodiment of the invention is explained. FIG. 6 shows the configuration of principal portions of the interferometer of the fourth embodiment of the invention. In FIG. 6 also, members which are the same as members shown in FIG. 1 are assigned the same symbols. As shown in FIG. 6, the interferometer 4 of this embodiment is a Michelson-type delayed interferometer including a beam splitter 41 (splitting element) in place of the beam splitters 11 and 14 in FIG. 1.

Figure 7:
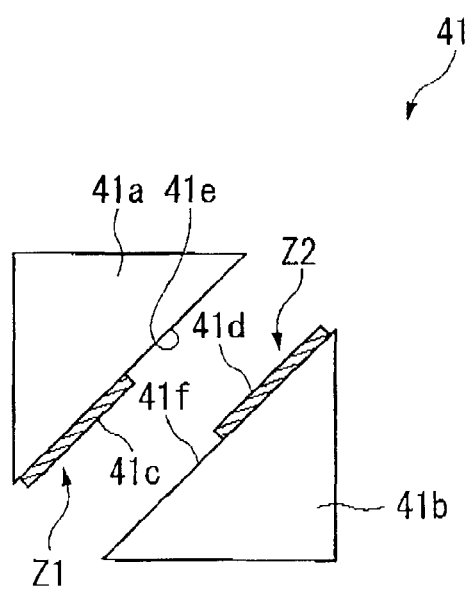
FIG. 7 is an exploded view of a beam splitter of the fourth embodiment.

FIG. 7 is an exploded view of the beam splitter 41. As shown in FIG. 7, the beam splitter 41 has a transparent medium 41a (first transparent medium) having a triangular pole shape, the cross-sectional shape of which is a right isosceles triangle, and a transparent medium 41b (second transparent medium) having the same shape as the transparent medium 41a. The transparent medium 41a has a triangular pole shape, the cross-sectional shape of which is a right isosceles triangle. On the side face 41e of the transparent medium 41a which forms the hypotenuse of the right isosceles triangle, a splitting film 41c is partially formed. Similarly, on the side face 41f of the transparent medium 41b which forms the hypotenuse of the right isosceles triangle, a splitting film 41d is partially formed. The transparent mediums 41a and 41b are formed for example from BK7, which is a kind of glass. The splitting films 41c and 41d are thin films which are for example multilayer dielectric films, metal thin films, or combinations of a multilayer dielectric film and a metal thin film. The splitting film 41c and the splitting film 41d have the same construction.

More specifically, for example, the splitting film 41c is formed on the side face 41e of the transparent medium 41a, extending from the top edge to the bottom edge of the transparent medium 41a, with a fixed width in the axial direction (the direction perpendicular to the plane of the paper in FIG. 6) of the transparent medium 41a. The splitting film 41d is formed on the side face 41e of the transparent medium 41b, extending from the top edge to the bottom edge of the transparent medium 41b, with a fixed width in the axial direction (the direction perpendicular to the plane of the paper in FIG. 6) of the transparent medium 41b, such that, when the side face 41e of the transparent medium 41a and the side face 41f of the transparent medium 41b are placed in opposition, and when viewed from the direction perpendicular to the side face 41e of the transparent medium 41a (or perpendicular to the side face 41f of the transparent medium 41b), there is no overlap with the splitting film 41c.

The beam splitter 41 is formed by laminating the side face 41e of the transparent medium 41a and the side face 41f of the transparent medium 41b such that there is no overlap of the splitting film 41c and splitting film 41d. More specifically, in the beam splitter 41, the splitting film 41d is laminated onto the side face 41e of the transparent medium 41a, and the splitting film 41c is laminated onto the side face 41f of the transparent medium 41b. The portion of the side face 41e of the transparent medium 41a on which the splitting film 41c is formed is called the first splitting portion Z1. The portion of the side face 41f of the transparent medium 41b on which the splitting film 41d is formed is called the second splitting portion Z2. The first splitting portion Z1 and second splitting portion Z2 are formed so as to have similar (and preferably identical) reflection and transmission characteristics.

The beam splitter 41 is positioned such that the positional relationship between the transparent medium 41b and splitting film 41d with respect to the direction of incidence on the splitting portion Z1 of the split beam L1, and the positional relationship between the transparent medium 41a and splitting film 41c with respect to the direction of incidence on the splitting portion Z1 of incident light L0, are opposite. In other words, the beam splitter 41 is positioned such that the incident light L0 and split beam L1 can be incident as follows. That is, incident light L0 which has passed through the transparent medium 41b is incident on the splitting film 41c in the first splitting portion Z1, after which the split beam L2 that is the incident light L0 passed through the splitting film 41c is incident on the transparent medium 41a. The split beam L1 reflected by the right-angle prism mirror 12 is incident on the transparent medium 41b, and is then incident on the splitting film 41d in the second splitting portion Z2, after which light that is the split beam L1 passed through the splitting film 41d is incident on the transparent medium 41a.

In this embodiment also, the beam splitter 41 may be positioned such that the positional relationship between the transparent medium 41a and splitting film 41c of the beam splitter 41 with respect to the incident light L0, and the positional relationship between the transparent medium 41b and the splitting film 41d of the beam splitter 41 with respect to the split beam L1, ate each opposite to the positional relationships shown in FIG. 6.

This beam splitter 41 splits the incident light L0 incident on the first splitting portion Z1 into a split beam L1 (first split beam) and split beam L2 (second split beam) having a prescribed intensity ratio (for example, 1:1). The beam splitter 41 combines and causes interference between the split beam L1, which has been reflected by the first splitting portion Z1, has been reflected by the right-angle prism mirror 12 and is incident on the second splitting portion Z2, and the split beam L2, which has been passed by the first splitting portion Z1, has been reflected by the right-angle prism mirror 13, and is incident on the second splitting portion Z2. Further, the beam splitter 41 splits the interference light obtained by interference into an interference beam L3 and an interference beam L4 having a prescribed intensity ratio (for example, 1:1).

Methods of manufacture of the beam splitter 41 are briefly described. As explained above, it is desirable that the first splitting portion Z1 and second splitting portion Z2 of the beam splitter 41 have similar (and preferable identical) reflection and transmission characteristics. The methods of manufacture described below are methods of manufacture appropriate for ensuring that the reflection and transmission characteristics of the first splitting portion Z1 and second splitting portion Z2 are identical insofar as possible.

Figure 8A:
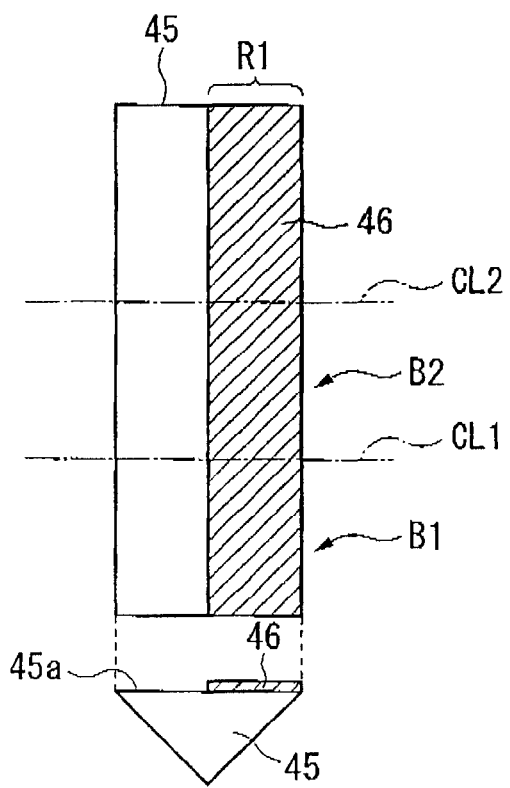
FIG. 8A is a figure used to explain a first method of manufacture of a beam splitter of the fourth embodiment.
Figure 8B:
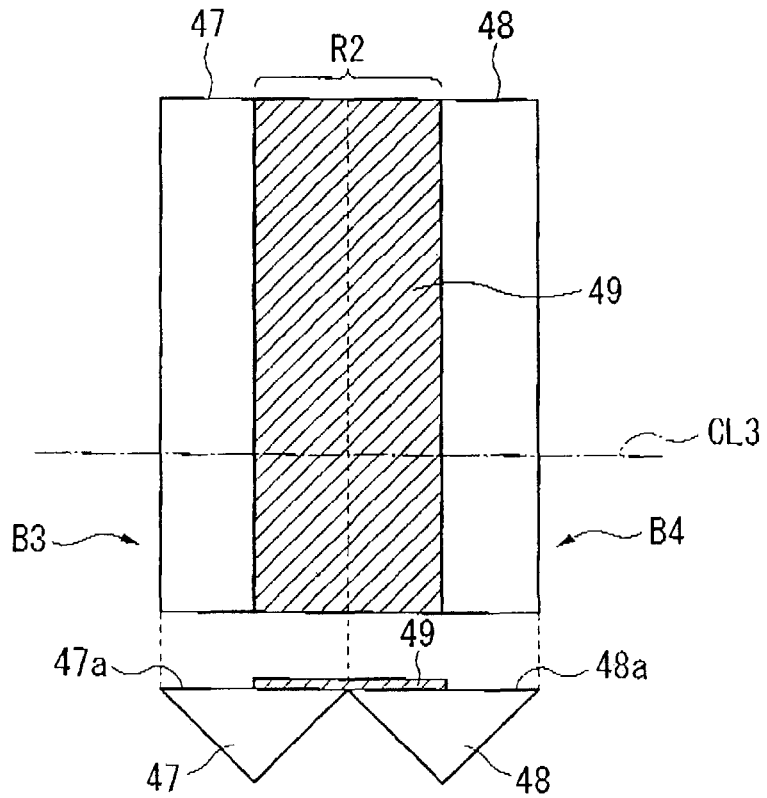
FIG. 8B is a figure used to explain a second method of manufacture of a beam splitter of the fourth embodiment.

FIG. 8A and FIG. 8B are figures used to explain methods of manufacture of a beam splitter 41. FIG. 5A shows a first method of manufacture of a beam splitter 41. The transparent medium 45 has a triangular pole shape, the cross-sectional shape of which is a right isosceles triangle. At first, evaporation deposition or another method is used to form a splitting film 46 on the side face 45a of the transparent medium 45, only in the area R1 on one side of the side face 45a along the axial direction as shown in FIG. 8A. Next, the transparent medium 45 on which the splitting film 46 has been formed is cut along the cutting planes CL1 and CL2 shown in FIG. 8A.

By means of the above processes, blocks B1 and B2 are obtained, on the side faces 45a of the transparent medium 45 of which a splitting film 46 with the same construction has been formed. Block B1 is equivalent to the transparent medium 41a on which a splitting film 41c is formed in FIG. 7. Block B2 is equivalent to the transparent medium 41b on which a splitting film 41d is formed in FIG. 7. By laminating together the side faces of blocks B1 and 132 such that there is no overlap of the splitting films 46, the beam splitter 41 is fabricated.

FIG. 8B shows a second method of manufacture of a beam splitter 41. The transparent mediums 47 and 48 each have a triangular pole shape, the cross-sectional shape of which is a right isosceles triangle. At first, transparent mediums 47 and 48 are arranged such that the side faces 47a and 48a are contained in the same plane, and moreover the transparent mediums 47 and 48 are in contact as shown in FIG. 8B. Next, evaporation deposition or another method is used to form a splitting film 49 on the side faces 47a and 48a of the transparent mediums 47 and 48, only on the areas R2 on one side of each of the side faces 47a and 48a along the axial direction. By this means, a split film 49 is formed on the side faces 47a and 48a of the transparent mediums 47 and 48, spanning the transparent mediums 47 and 48.

Next, the transparent mediums 47 and 48, on which the splitting film 49 has been formed, are cut along the cutting plane CL3 shown in FIG. 8B. By means of the above processes, blocks B3 and B4 are obtained on which splitting films 49 having the same construction are partially formed on the side face 47a of the transparent medium 47 and on the side face 48a of the transparent medium 48. Block B3 is equivalent to the transparent medium 41a shown in FIG. 7 on which the splitting film 41c is formed. Block B4 is equivalent to the transparent medium 41b shown in FIG. 7 on which the splitting film 41d is formed. By laminating the side faces of the blocks B3 and B4 together such that the splitting films 49 do not overlap, the beam splitter 41 is fabricated.

As explained above, the interferometer 4 of this embodiment includes a beam splitter 41 which is formed by laminating the side face 41e of a transparent medium 41a on the side face 41e of which is partially formed a splitting film 41c with the side face 41f of a transparent medium 411b on the side face 41f of which is partially formed a splitting film 41d, such that the splitting films 41c and 41d do not overlap. Hence the positional relationship between the transparent medium 41a and splitting film 41c of the beam splitter 41 with respect to the direction of incidence on the first splitting portion Z1 of incident light L0, and the positional relation between the transparent medium 41b and the splitting film 41d of the beam splitter 41 with respect to the direction of incidence on the second splitting portion of the split beam L1, can be made opposite.

By this means, in the interferometer 4 of this embodiment, the phase difference between the split beams L1 and L2 occurring when the incident light L0 is split by the first splitting portion Z1 of the beam splitter 41 can be compensated when causing interference of the split beams L1 and L2 at the second splitting portion Z2 of the beam splitter 41. Hence in the interferometer 4 of this embodiment also, polarization-dependent frequency shifts (PDFS) of the interferometer 4 can be reduced.

Fifth Embodiment

Figure 9:
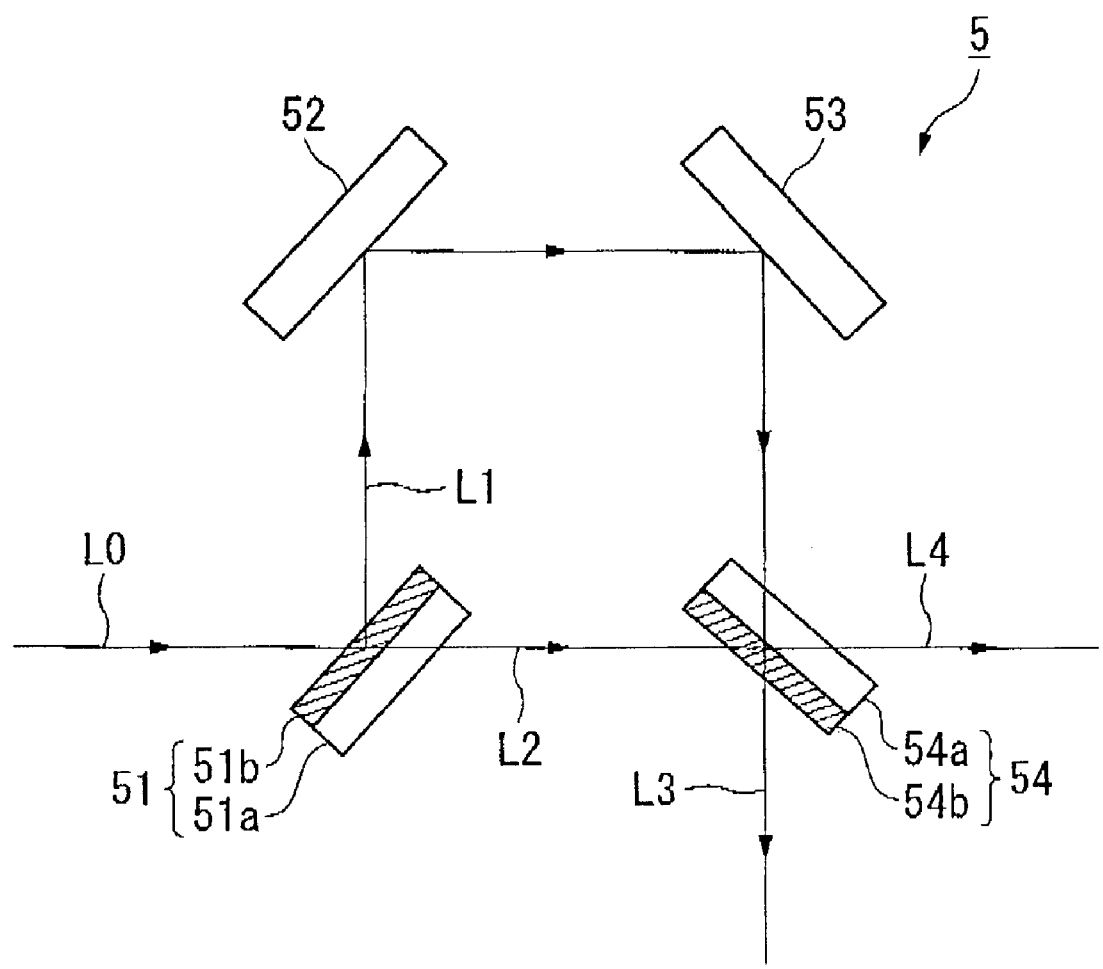
FIG. 9 shows the configuration of principal portions of the interferometer of a fifth embodiment of the invention.

FIG. 9 shows the configuration of principal portions of the interferometer of a fifth embodiment of the invention. As show in FIG. 9, the interferometer 1 of this embodiment is a Mach-Zehnder delayed interferometer, including a beam splitter 51 (first splitting element), reflecting mirrors 52 and 53, and a beam splitter 54 (second splitting element).

The beam splitter 51 is formed by a plate shape transparent substrate 51a (transparent medium) and a splitting film 51b formed on one face of the transparent substrate 51a. The beam splitter 51 splits the incident light L0 into a split beam L1 (first split beam) and a split beam L2 (second split beam) having a prescribed intensity ratio (for example, 1:1). The transparent substrate 51a is a glass substrate formed for example from BK7, which is a kind of glass. The splitting film 51b is a thin film which is for example a multilayer dielectric film, a metal thin film, or a combination of a multilayer dielectric film and a metal thin film. The reflecting mirrors 52 and 53 reflect in sequence the split beam L1 that is the incident light L0 reflected by the beam splitter 51, to guide the split beam L1 to the beam splitter 54.

The beam splitter 54 is formed by a plate shape transparent substrate 54a (transparent medium) and a splitting film 54b formed on one face of the transparent substrate 54a. The beam splitter 54 combines and causes interference of the split beam L1 which has been reflected in sequence by the reflecting mirrors 52 and 53, and the split beam L2 that is the incident light L0 passed through the beam splitter 51. Further, the beam splitter 54 splits the interference light obtained from interference into an interference beam L3 and an interference beam L4 having a prescribed intensity ratio (for example, 1:1). These interference beams L3 and L4 are emitted to the outside.

Similarly to the transparent substrate 51a of the beam splitter 51, the transparent substrate 54a is a glass substrate formed for example from BK7, which is a kind of glass. The splitting film 54b is a thin film which is for example a multilayer dielectric film, a metal thin film, or a combination of a multilayer dielectric film and a metal thin film. The splitting film 54b has the same construction as the splitting film 51b formed on the transparent substrate 51a of the beam splitter 51, and has similar (and preferably identical) reflection and transmission characteristics.

The beam splitter 54 is positioned such that the positional relationship between the transparent substrate 54a and the splitting film 54b with respect to the direction of incidence on the beam splitter 54 of the split beam L1 that is the incident light L0 reflected by the beam splitter 51, and the positional relationship between the transparent substrate 51a and the splitting film 51b of the beam splitter 51 with respect to the direction of incidence on the beam splitter 51 of the incident light L0, are opposite. That is, referring to FIG. 9, the beam splitter 51 is positioned in a positional relationship in which the incident light L0 is first incident on the splitting film 51b, and then the split beam L2 that is the incident light L0 passed through the splitting film 51b is incident on the transparent substrate 51a. On the other hand, the beam splitter 54 is positioned in a positional relationship in which the split beam L1 that is the incident light L0 reflected by the beam splitter 51 is first incident on the transparent substrate 54a, and is then incident on the splitting film 54b.

The beam splitter 54 is positioned as described above relative to the beam splitter 51. Hence in the interferometer 5 of this embodiment, the phase difference between the split beams L1 and L2 occurring when the beam splitter 51 splits the incident light L0 can be compensated when causing interference of the split beams L1 and L2 at the beam splitter 54. Hence in the interferometer 5 of this embodiment also, polarization-dependent frequency shift (PDFS) of the interferometer 5 can be reduced. In this embodiment also, the beam splitters 51 and 54 may be positioned such that the positional relationship between the transparent medium 51a and splitting film 51b of the beam splitter 51 with respect to the direction of incidence on the beam splitter 51 of the incident light L0, and the positional relationship between the transparent medium 54a and the splitting film 54b of the beam splitter 54 with respect to the direction of incidence on the beam splitter 54 of the split beam L1, are each opposite of the above.

Sixth Embodiment

Figure 10:
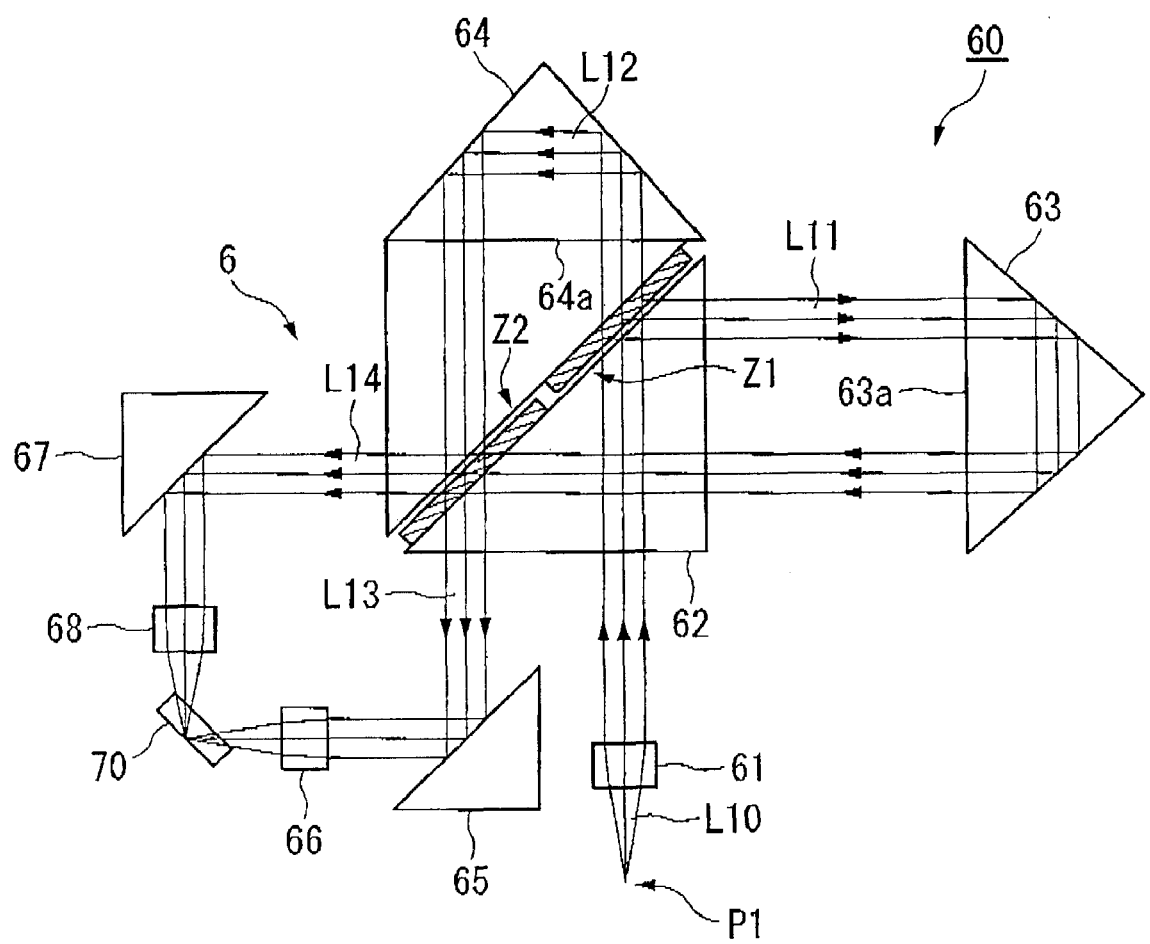
FIG. 10 shows the configuration of principal portions of a demodulator including an interferometer in a sixth embodiment of the invention.

FIG. 10 shows the configuration of principal portions of a demodulator including the interferometer of a sixth aspect of the invention. As shown in FIG. 10, the demodulator 60 includes the interferometer 6 of the sixth embodiment of the invention and a photodetector 70. The interferometer 6 is a Michelson-type delayed interferometer, including an incidence lens 61, beam splitter 62 (splitting element), right-angle prism mirrors 63 and 64, reflecting mirror 65, condenser lens 66, reflecting mirror 67, and condenser lens 68.

The incidence lens 61 converts the WDM (wavelength division multiplexing) light L10 (optical signals) incident from the incidence port P1 into a parallel light beam. The WDM light L10 is optical signals obtained by wavelength division multiplexing (WDM) of optical signals modulated by differential phase shift keying (DPSK) or another modulation method. At the position of the incidence port P1, for example, the emission end of an optical fiber (not shown) is positioned, and light emitted from the emission end of this optical fiber is incident into the interferometer 6 as WDM light L10.

The beam splitter 62 is similar to the beam splitter 41 shown in FIG. 6. The beam splitter 62 splits the WDM light L10 which has been converted into a parallel beam by the incidence lens 61 and is incident on the first splitting portion Z1 into split beams L11 and L12 with a prescribed intensity ratio (for example, 1:1). The beam splitter 62 combines and causes interference of the split beams L11 and L12 reflected by the right-angle prism mirrors 63 and 64 and incident on the second splitting portion Z2, while compensating the phase difference therebetween. Further, the beam splitter 62 splits the interference light obtained by interference into interference beams L13 and L14 with a prescribed intensity ratio (for example, 1:1).

The right-angle prism mirror 63 has a triangular pole shape, the cross-sectional shape of which is a right isosceles triangle, and is a mirror with the two perpendicular faces as reflecting faces. The right-angle prism mirror 63 shifts the optical path of and reflects the split beam L11, which is the WDM light L10 reflected by the beam splitter 62, toward the beam splitter 62. The right-angle prism mirror 63 is positioned relative to the beam splitter 62 such that the split beam L11 is delayed relative to the split beam L12 by a time duration equivalent to one bit of the modulation rate of the WDM light L10. The delay time of the split beam L11 relative to the split beam. L12 can be set arbitrarily.

Similarly to the tight-angle prism mirror 63, the right-angle prism mirror 64 has a triangular pole shape, the cross-sectional shape of which is a right isosceles triangle, and is a mirror with the two perpendicular faces as reflecting faces. The right-angle prism mirror 64 shifts the optical path of and reflects the split beam L1, which is the WDM light L10 passed through the first splitting portion Z1 of the beam splitter 62, toward the beam splitter 62. The side face 64a of this right-angle prism mirror 64 which forms the hypotenuse is laminated onto one face of the beam splitter 62 (the face from which the split beam L12 is emitted).

The reflecting mirror 65 is positioned in the optical path of one of the interference beams, namely the interference beam L13, obtained by causing interference of the split beam L11 and the split beam L12. The reflecting mirror 65 reflects the interference beam L13 toward the condenser lens 66. The condenser lens 66 condenses the interference beam L13 reflected by the reflecting mirror 65 onto the light-receiving face of the photodetector 70. The reflecting mirror 67 is positioned in the optical path of the other interference beam, namely the interference beam L14, obtained by causing interference of the split beam L11 and the split beam L12. The reflecting mirror 67 reflects the interference beam L14 toward the condenser lens 68. The condenser lens 68 condenses the interference beam L14, reflected by the reflecting mirror 67, onto the light-receiving face of the photodetector 70. The above-described reflecting mirror 65, condenser lens 66, reflecting mirror 67, and condenser lens 68 are positioned relative to the beam splitter 62 such that the optical path of the interference beam L13 and the optical path of the interference beam L14 are the same length.

The photodetector 70 is a balanced photodetector including a light-receiving element (not shown) which receives the interference beam L13 and a light-receiving element (not shown) which receives the interference beam L14. The photodetector 70 performs balancing processing of the electrical signals output from each of these light-receiving elements, and outputs a demodulated signal for the WDM light L10. A balanced detection system is realized by the above-described reflecting mirror 65, condenser lens 66, reflecting mirror 67, condenser mirror 68, and photodetector 70 employed by the interferometer 6.

WDM light L10 input to a demodulator configured as described above is incident and enters the interferometer 6 from the incidence port P1. Further, the WDM light L10 is converted into a parallel beam by the incidence lens 61, and is ten split into split beams L11 and L12 by the first splitting portion Z1 of the beam splitter 62. A phase difference occurs between the split beam L11 and the split beam L12, arising due to imperfection of the splitting film formed in the first splitting portion Z1. One of the split beams, namely the split beam L11, is incident on the right-angle prism mirror 63 from the side face 63a of the right-angle prism mirror 63. Then, the split beam L11 is reflected in sequence by the two perpendicular faces of the right-angle prism mirror 63, and is incident on the second splitting portion Z2 of the beam splitter 62.

On the other band, the other split beam L12 is incident on the right-angle prism mirror 64 from the side face 64a of the right-angle prism mirror 64. Next, the split beam L12 is reflected in sequence by the two perpendicular faces of the right-angle prism mirror 64, and is then incident on the second splitting portion Z2 of the beam splitter 62. Through propagation in different optical paths of the split beams L11 and L12, the split beam L11 is delayed relative to the split beam L12 by a time duration equivalent to one bit of the modulation rate of the WDM light L10.

The split beams L11 and L12 incident on the second splitting portion Z2 of the beam splitter 62 are combined and made to interfere, and at the same time the phase difference therebetween is compensated. By this means, interference beams L13 and L14 are obtained in which phase comparison of the split beam L12 with the split beam L11 delayed by the above time duration is performed. The interference beam L13 is reflected by the reflecting mirror 65 and passes through the condenser lens 66, and is then received by one of the light-receiving elements of the photodetector 70. The interference beam L14 is reflected by the reflecting mirror 67 and passes through the condenser lens 68, and is then received by the other light-receiving element of the photodetector 70. The photodetector 70 performs balancing processing of the electrical signals output from these light-receiving elements, and outputs a demodulated signal of the WDM light L10.

The interferometer employed by the demodulator 60 is not limited to the interferometer 6 shown in FIG. 10. In place of the interferometer 6, the interferometers 1 through 5 of the above-described first through fifth embodiments can be used. As explained above, the demodulator 60 includes an interferometer 6 which can reduce the polarization-dependent frequency shift (PDFS) by compensating the phase difference between the split beams L1 and L2 when the split beams L1 and L2 are made to interfere. Hence the performance of the demodulator 60 (for example, the optical signal-to-noise ratio (OSNR), Q value, and similar) can be improved.

In the above, interferometers, demodulators, and splitting elements of embodiments of the invention have been explained. The present invention is not limited to the above embodiments, and various modifications are possible within the scope of the invention. For example, in the above-described embodiments, examples of interferometers are given which employ beam splitters as splitting elements; but half-mirrors may be employed as splitting elements in interferometers as well. In the above embodiments, examples are given of Mach-Zehnder delayed interferometers and Michelson delayed interferometers; but this invention is not limited to delayed interferometers. That is, this invention can be applied to interferometers in general which include a splitting element which splits incident light into a plurality of split beams, and which cause interference of split beams split by this splitting element.

What is claimed is:

1. An interferometer comprising a splitting element including:
   a first splitting portion which splits incident light into a first split beam and a second split beam; and
   a second splitting portion which causes interference between the first split beam and the second split beam propagated over different optical paths, while compensating a phase difference between the first split beam and the second split beam occurring upon splitting of the incident light by said first splitting portion, wherein:
   said splitting element includes a first transparent medium having a triangular pole shape, a cross-sectional shape of said first transparent medium being a right isosceles triangle, and a first splitting film being partially formed on a first side face which forms a hypotenuse of said right isosceles triangle, and a second transparent medium having a triangular pole shape, a cross-sectional shape of said second transparent medium being a right isosceles triangle, and a second splitting film being partially formed on a second side face which forms a hypotenuse of said right isosceles triangle;
   said first side face is laminated to said second side face such that said first splitting film and said second splitting film do not overlap with each other;
   said first splitting portion is a portion on which said first splitting film is formed, and said second splitting portion is a portion on which said second splitting film is formed; and
   said splitting element is positioned such that a positional relationship between said second transparent medium and said second splitting film in said second splitting portion with respect to a direction of incidence on said second splitting portion of the first split beam that is the incident light reflected by said first splitting portion, is opposite to a positional relationship between said first transparent medium and said first splitting film in said first splitting portion with respect to a direction of incidence on said first splitting portion of the incident light.

2. The interferometer according to claim 1, wherein:
   said splitting element includes a transparent medium having a plate shape, a first splitting film formed in a portion of a top surface of said transparent medium, and a second splitting film formed in a portion of a bottom surface of said transparent medium, said first splitting film and said second splitting film being formed such that there is no mutual overlap when viewed from a direction perpendicular to said top surface and said bottom surface;
   said first splitting portion is a portion on which said first splitting film is formed, and said second splitting portion is a portion on which said second splitting film is formed; and
   said splitting element is positioned such that the incident light is incident on said first splitting portion from a side of said top surface, and such that the first split beam that is the incident light reflected by said first splitting portion, is incident on said second splitting portion from the side of said top surface.

3. The interferometer according to claim 1, further comprising a first reflecting member and a second reflecting member which respectively reflect the first split beam and the second split beam propagating over different optical paths, toward said second splitting portion.

4. A demodulator which demodulates an optical signal modulated by differential phase shift-keying, comprising:
   said interferometer according to claim 1 in which a difference in optical path lengths of the first split beam and the second split beam is set such that the first split beam is delayed relative to the second split beam by a time duration equivalent to one bit of a modulation rate of the optical signal; and
   a photodetector which receives interference light obtained from said interferometer and generates a demodulated signal.

5. The interferometer according to claim 1, wherein said second splitting film is laminated to said first side face, and said first splitting film is laminated to said second side face.

6. A splitting element which splits incident light, comprising:
   a first transparent medium having a triangular pole shape, a cross-sectional shape of said first transparent medium being a right isosceles triangle, and a first splitting film being partially formed on a first side face which forms a hypotenuse of said right isosceles triangle; and
   a second transparent medium having a triangular pole shape, a cross-sectional shape of said second transparent medium being a right isosceles triangle, and a second splitting film being partially formed on a second side face which forms a hypotenuse of said right isosceles triangle,
   said first side face being laminated to said second side face such that said first splitting film and said second splitting film do not overlap with each other.

7. The splitting element according to claim 6, wherein said second splitting film is laminated to said first side face, and said first splitting film is laminated to said second side face.

* * * * *